United States Patent [19]

Morley et al.

[11] Patent Number: 5,365,057
[45] Date of Patent: Nov. 15, 1994

[54] LIGHT-WEIGHT NIGHT VISION DEVICE

[75] Inventors: Roland M. Morley, Tempe; O'Dell Keil, Paradise Valley, both of Ariz.

[73] Assignee: Litton Systems, Inc., Woodland Hills, Calif.

[21] Appl. No.: 87,498

[22] Filed: Jul. 2, 1993

[51] Int. Cl.⁵ ............................................. H01J 31/50
[52] U.S. Cl. ................... 250/214 VT; 33/233; 359/400
[58] Field of Search ............ 250/214 VT; 356/141, 356/152; 359/353, 400, 630; 33/233; 313/524

[56] References Cited

U.S. PATENT DOCUMENTS

| | | | |
|---|---|---|---|
| 4,524,675 | 6/1985 | Durenec et al. | 33/233 X |
| 5,200,827 | 4/1993 | Hanson et al. | 359/146 |
| 5,283,427 | 2/1994 | Phillips et al. | 250/214 VT |

Primary Examiner—David C. Nelms
Assistant Examiner—John R. Lee
Attorney, Agent, or Firm—Poms, Smith, Lande & Rose

[57] ABSTRACT

A light-weight night vision device includes a housing carrying an objective lens through which low-level light from a scene to be viewed is received. The housing carries an image intensifier tube receiving the low-level light from the objective lens, and providing in response an image representative of the scene. An eye piece carried by the housing provides a user of the device with an view of the representative image. The housing includes a light-weight portion which both carries the objective lens and partially houses the image intensifier tube. This light-weight housing portion also serves to shield the image intensifier tube from radio frequency and electrostatic interference.

19 Claims, 2 Drawing Sheets

LIGHT-WEIGHT NIGHT VISION DEVICE

BACKGROUND OF THE INVENTION

1. Field of the Invention

The present invention relates to a night vision device. More particularly, the present invention relates to a night vision device of the type which removably and relatively movably attaches to a support structure which is secured to a face mask or to a helmet, for example, to thereby be supported in front of at least one eye of the user. As thus supported, the night vision device may be used by the wearer of the helmet or face mask to view a night scene while the user's hands remain free. Still more particularly, the present invention relates to such a night vision device having a significantly reduced weight and polar moment of inertia in comparison to a conventional night vision device. Thus, the inventive night vision device significantly reduces the weight carried on the head of a user of the device and reduces neck strain for this user, as well as improving the ease of use of the night vision device by improving its maneuverability.

2. Related Technology

A conventional night vision device is known as the AN/PVS-7B. This night vision device includes a housing with a single objective lens through which low-level light from a night scene is received. The night scene may be illuminated, for example, only by star light. The housing of the conventional AN/PVS-7B also included an image intensifier tube which provides a phosphor yellow-green light image representative of the night scene of low-level illumination viewed through the single objective lens, an image splitter, and a pair of eye pieces in which a user of the device may view the intensified image with each eye.

As will be well understood to those ordinarily skilled in the pertinent arts, the head-mounted night vision devices all represent a certain weight which the users of the devices must carry on their heads. Additionally, this weight for many night vision devices, such as the AN/PVS-7B, is cantilevered forwardly of the user's face. Consequently, the user experiences a significant downward weight tending to nod his head forward. In order to resist this nodding moment on his head, the user must make a conscious effort to keep his head up. After a period of wearing the night vision systems, users become accustomed to the extra effort necessary to keep their heads level. However, complaints of neck fatigue and strain are common.

Additionally, the cantilever mounting of such night vision devices places their mass at a considerable distance from the pivot axis for the user's head when the head is turned from side to side. Generally, this pivot axis may be considered to be at the vertical alignment of the user's spine. Accordingly, the mass of the night vision device is several inches from this pivot axis, and represents a significant moment of inertia which the user must overcome in turning his head. Also, when the user's head is turned quickly and stopped, the inertia of the night vision device tends to make the device overshoot the user's head position, and to carry the user's head along in this overshoot.

One partial, and not completely satisfactory, solution to this nodding weight problem is to counterbalance the weight of the night vision device. Accordingly, some night vision systems simply hang a battery pack for the device off the back of the helmet which the user is wearing. However, this expedient further increases the weight which the user must carry on his head, and very significantly increases the inertia of the night vision system. That is, the moment of inertia of the night vision system varies as the integral of the masses of the system components times the square of the radius of the masses from the pivot axis. Thus, its is easy to see that placing a relatively heavy battery pack at the rear of the user's head adds considerably to the inertia of the complete night vision system.

SUMMARY OF THE INVENTION

In view of the deficiencies of conventional night vision devices, as outlined above, a primary object for the present invention is to provide a night vision device with a significantly reduced weight in comparison to a conventional night vision device.

Another objective for the present invention is to provide such a reduced-weight night vision device in which the area of weight reduction in comparison with a conventional night vision device is located relatively far from the user. In other words, not only is the weight of the night vision device to be reduced, but the weight reduction is to be effected at an area of the device which both reduces the nodding moment effective from the device on a user, and also reduces the moment of inertia of the device with respect to head turning of the user.

Still another object of the present invention is to provide the outlined weight reductions in a night vision device fully meeting operational requirements for the device in adverse conditions. That is, use environment conditions for night vision devices include requirements that the devices function satisfactorily in high radiated field conditions. The night vision devices may be subjected to high radio-frequency field, such as those existing close to a powerful radio transmitter or radar set. Also, conditions of high electrostatic field can not be allowed to adversely affect the operation of the devices.

Still another objective for the present invention is to provide the above-identified structural and functional features in an AN/PVS-7b type of night vision device.

Accordingly, the present invention provides a night vision device including a housing which may be suspended relative to a user's head and eyes, the housing carrying an objective lens admitting low-level light from a night scene, an image intensifier apparatus providing an intensified image representative of the low-level scene, and an eye piece into which the use may look with at least one eye to view the intensified representative image. The night vision device further including a light-weight housing portion disposed at the front thereof and carrying the objective lens. The light weight housing portion also partially carrying the image intensifier tube, and providing shielding for the image intensifier tube from radio frequency and electrostatic fields.

Preferably, the light weight housing component is fabricated of an engineering polymer. According to one preferred embodiment of the present invention, the light weight component of the housing includes a metallic coating circumscribing the image intensifier tube and providing shielding to the tube from electrostatic and radio frequency fields. Alternatively, the light weight component may be made of a polymer material which is sufficiently conductive as to provide the requisite shielding effect. One version of the latter embodiment includes a material which is an alloy of polycarbonate and polyester, and which is loaded with about 30 weight percent of conductive carbon fibers.

Additional objects and advantages of the present invention will appear from a reading of the following detailed description of a single preferred exemplary embodiment of the present invention taken in conjunction with the following drawing Figures, in which:

DESCRIPTION OF THE DRAWING FIGURES

FIG. 1 provides a fragmentary perspective view of a user wearing a helmet carrying a support structure which supports a night vision viewer in front of the user's eyes;

FIG. 2 is a fragmentary cross sectional view of a portion of FIG. 1, shown at an enlarged scale to better illustrate salient features of the invention; and FIG. 3 is a further enlarged cross sectional view of a component part of the night vision viewer seen in FIGS. 1 and 2.

FIG. 4 provides an end elevation view of the component part seen in FIG. 4, taken along line 4—4 of FIG. 3.

DESCRIPTION OF THE PREFERRED EMBODIMENT

Figure 1:
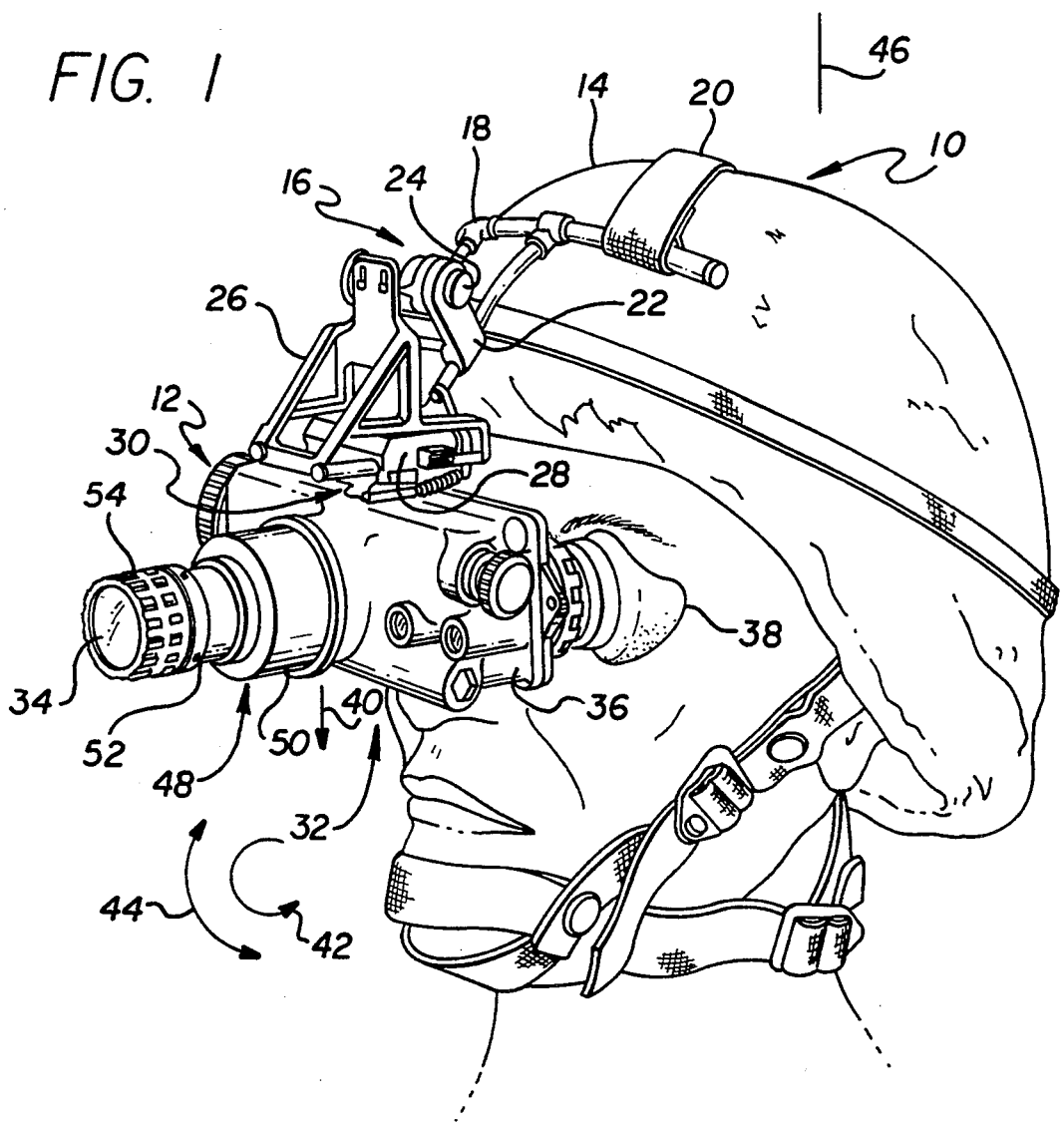
Figure 4:
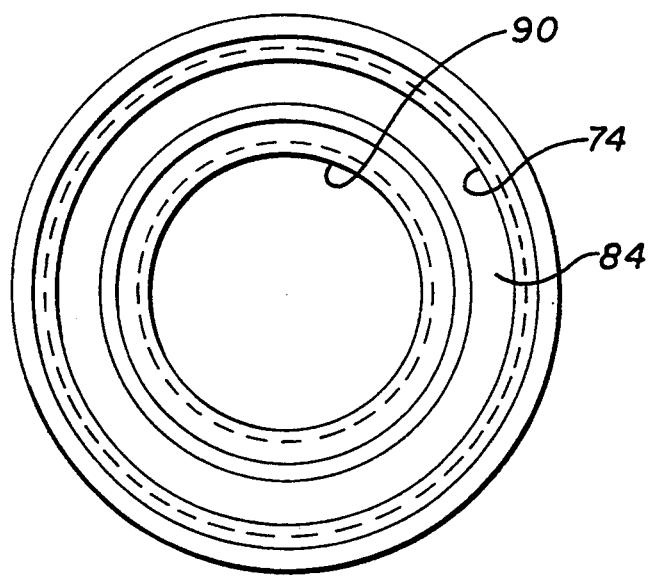

Referring first to FIG. 1, an operator 10 is shown using a night vision system 12. The operator 10 wears a helmet 14 carrying a support structure portion 16 of the night vision system 12. This support structure 16 includes a frame 18 secured to the helmet 14 with various straps 20 and having a forwardly and upwardly extending clevis 22. The clevis 22 carries a hinge pin 24 (best seen in FIG. 2) for a flip up mount portion 26 of the support structure 16. Consequently, the flip up mount portion 26 of the support structure 16 is hinged on the clevis 22 for pivotal movement about hinge pin 24. The flip up mount portion 26 carries a carriage 28 and a coupling device 30. A night vision viewer 32 is suspended from the support structure 16 at the coupling device 30. The depicted night vision viewer 32 is of the type known as an AN/PVS-7B. This night vision viewer 32 is of goggle configuration and includes a single objective lens 34, a housing 36, and a pair of eye pieces 38 aligned with respective eyes of the operator 10.

To use the night vision viewer 32, the operator 10 places it in the use position depicted in FIGS. 1, and looks into eye pieces 38 to see an enhanced image representative of the low-level light from a night time scene which has entered objective lens 34. As those ordinarily skilled in the pertinent arts will appreciate, the night vision viewer 32 includes a power supply in the form of a battery pack (not visible in the drawing Figures), which may be carried on the back of the helmet 14, or carried in a breast pocket of the operator 10. This power supply is connected to the night vision viewer 32 by a power cable (also not illustrated in the drawing Figures). Internally of the night vision viewer, a power supply circuit provides power to an image intensifier tube, which is well known in the pertinent arts, and which supplies to the eye pieces 38 an intensified image in phosphor green light of the night time scene viewed via the objective lens 34.

Still viewing FIG. 1, it is easily appreciated that the night vision system 12 represents a weight which is carried on the head of the user 10. Particularly, with respect to the night vision viewer 32, the weight of this viewer causes a downward force, represented by the arrow 40, which is located forwardly of the user's face. Consequently, this weight force 40 causes a nodding moment on the user's head, represented by the circular arrow 42. In order to keep his head level, the user 10 must continuously provide a counter balancing force to the weight 40 and moment 42 with his neck muscles. Over a period of time, the requirement to resist this nodding moment from the weight of the night vision device 32 can be tiring, and lead to complaint of neck fatigue and strain.

As mentioned above, a conventional and unsatisfactory expedient is to counter weight the viewer 32 with the weight of a battery pack carried on the rear of the head. However, when the moment of inertia of the system 12 about a vertical axis aligned with the user's spine is considered, the undesirability of this conventional expedient is easily seen. That is, when the user 10 turns his head from side to side, this motion is generally a pivotal motion, represented by arrow 44, about a vertical axis aligned with the user's spine, represented by the line 46. The mass of the viewer 32 swings in an arc about the axis 46, and requires a significant force both to start and to stop motion of the viewer along this arc, as is represented by the moment of inertia of the viewer.

The moment of inertia of the viewer 32 about the axis 46 is proportional to the summation of the masses of the components of the viewer 32 multiplied by the square of the respective radius of each of these masses from the axis 46. Thus, it is easily appreciated that the eye pieces 38 are closest to the user, the housing 36 is next farthest away from the user, and the objective lens 34 is farthest away from the user and has the highest product of its radius squared.

Carefully considering the configuration of the viewer 32, it is seen that this viewer includes a forwardly extending boss 48, which in a larger diameter portion 50 thereof partially receives and houses the image intensifier tube for the night vision viewer 32, as will be further explained. In a smaller diameter portion 52, the boss 48 houses the lens system for objective lens 34, also as will be further explained. At the forward end of the boss 48, the objective lens 34 is exposed to receive light from a night scene, and the boss 48 carries a knurled rotational focus ring 54 for adjusting the system of objective lens 34 relative to the image intensifier tube.

Figure 2:
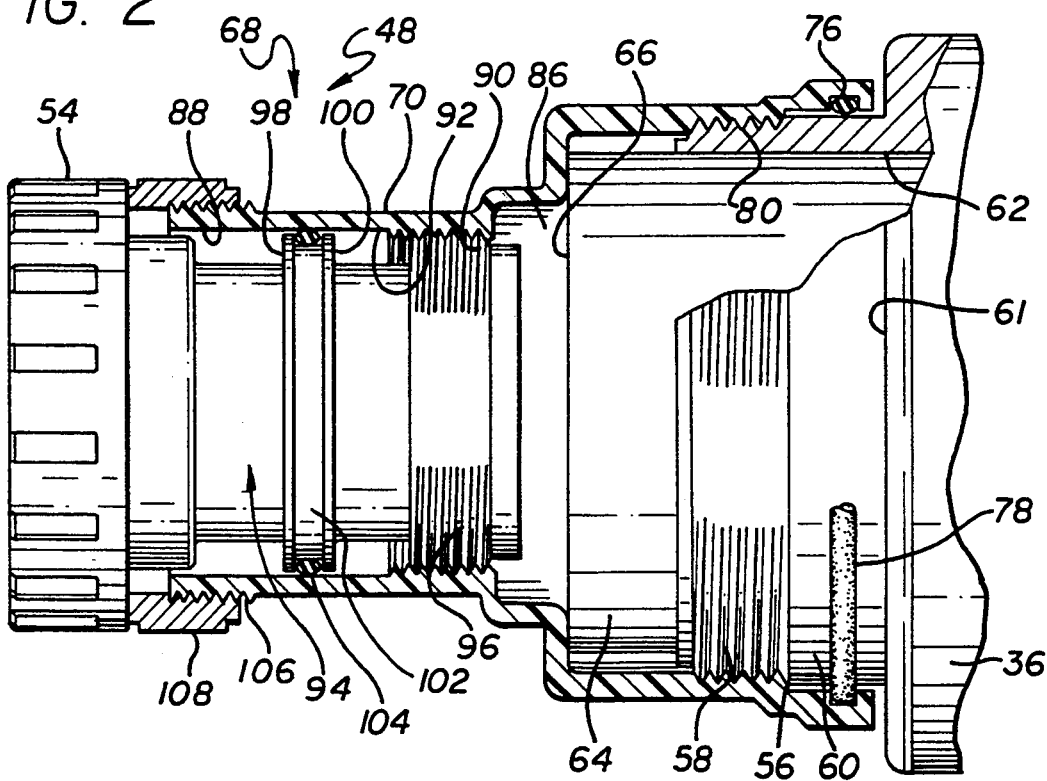
Figure 3:
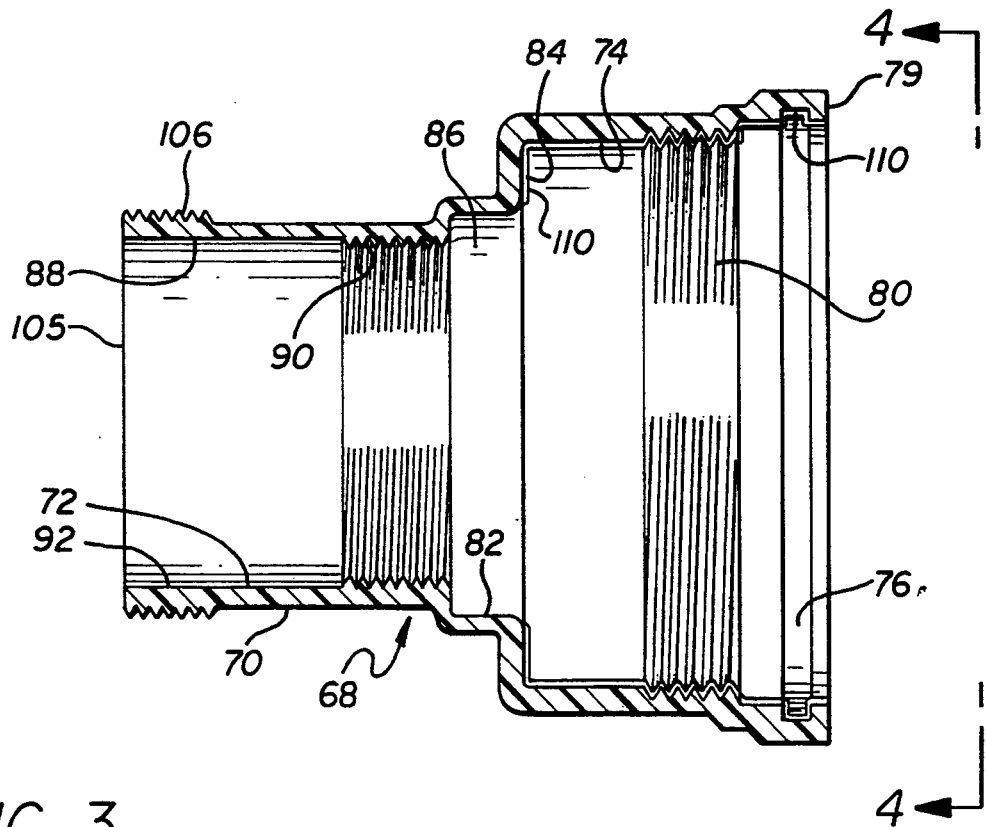

Viewing now FIGS. 2 and 3 in conjunction, it is seen that the boss 48 includes a forwardly extending mounting ring portion 56 including a forward externally threaded part 58 and a cylindrical part 60 adjacent to the remainder of the housing 36. At the junction of the cylindrical part 60 and the housing 36, the latter defines a shoulder 61. The mounting ring 56 circumscribes and defines a bore 62 opening outwardly from the housing 36. In this bore 62 is received the image intensifier tube 64 for the night vision viewer 34. This image intensifier tube outwardly is a cylindrical body which is circular in end view, and which defines an end edge 66.

Threadably received on the mounting ring 56 is an objective lens mounting collar member 68. This mounting collar member 68 includes a side wall 70 defining a stepped through bore 72. The stepped through bore 72 includes a first rearwardly opening larger diameter bore portion 74 having a radially inwardly opening seal groove 76. In the seal groove 76 is received an elastomeric sealing ring 78 which sealingly engages the cylindrical part 60 of mounting ring 56. Adjacent to the seal groove 76, the collar member 68 defines an end surface 79. Inwardly of the seal groove 76, the collar member 68 includes a thread-defining portion 80 of the bore part 74. This thread 80 threadably engages on the threaded part 58 of mounting ring 56.

Forwardly of the bore part 74, the mounting collar member 68 includes a reduced diameter bore part 82. This bore part 82 cooperates with the bore part 74 to define a shoulder 84 therebetween. In the bore part 82 and forwardly of the end edge 66 of image intensifier tube 64 is defined a chamber 86. Forwardly from the chamber 86 extends a smaller diameter bore part 88. This smaller diameter bore part 88 includes a thread-defining portion 90, and a straight circular cylindrical bore portion 92 forwardly of the thread portion 90.

As FIG. 2 illustrates, movably received sealingly in the bore part 88 and in chamber 86 of bore part 82, is a lens system holder for the objective lens 34, generally referred to with the numeral 94. This lens system holder 94 outwardly defines a threaded portion 96 which threadably engages the thread portion 90 of bore 88. Also, this lens system holder 94 defines a pair of axially spaced apart flanges 98, 100, which cooperatively define between them a seal groove 102. A sealing member 104 is received in the seal groove 102 and movably and sealingly engages the cylindrical portion 92 of bore part 88.

At the forward end of the bore part 88, adjacent to an end edge 105, the mounting collar member 68 includes an external thread part 106. On this thread part 106 is threadably received a retention collar 108 which rotationally cooperates with the focus ring 54 to limit the rearward travel of the objective lens system holder 94 in the bore 72.

Now considering FIG. 3, it is seen that the mounting collar member 68 is fabricated principally of a polymeric material. This polymeric material may be an alloy of polycarbonate and polyester. Two polymeric alloy materials of this type which are known to the applicant are available under the names, "Ultem", and, "Xenoy", from General Electric. Accordingly, the mounting collar member 68 is about 40 percent lighter than the conventional metallic mounting collar portion of an AN/PVS-7B night vision device. As will be appreciated in view of the above, this weight reduction of the night vision viewer 32 is important. Further, because the mounting collar member 68 is so far from the pivot axis 46 of the head of the user 10, this weight reduction has a drastic effect in reducing the moment of inertia of the viewer 32.

Also viewing FIG. 3, it is seen that the mounting collar member 68 also includes an internal conductive coating 110. This coating 110 extends over the shoulder 84, and over all of the bore part 74. That is, the conductive coating 110 not only covers the shoulder 84, but also covers all of the bore portion groove 76, and thread defining portion 80 as well. Viewing FIG. 2 once again, it is seen that the conductive coating circumscribes and shields from electromagnet radiation the part of the image intensifier tube 64 which is housed in the mounting collar member 68. This conductive coating 110 is preferably metallic, and includes a first flash coating of copper applied on the polymeric material from which the collar member 68 is formed. On the flash copper coating is formed a layer of nickel, followed by a layer of tin. Over all, the coating 110 is about 0.002 inches thick, and adds virtually no weight to the collar member 68. Accordingly, the weight reduction advantages of the present objective lens mounting collar structure are retained while necessary shielding is provided to the image intensifier tube 64.

Alternatively, other conductive coatings or coating systems may be used to form the conductive coating 110. That is, a conductive paint might be used on the inside of mounting collar member 68, at least in the portions of this collar member which house the image intensifier tube 64. Such conductive coatings and coating systems are intended to provide shielding for the image intensifier tube 64 with respect to electromagnetic, radio frequency, and electrostatic fields originating outside of the viewer 32. While it is believed that the preferred embodiment of the mounting collar member 68 including metallic conductive coating 110 will provide adequate shielding for the image intensifier tube 64, other conductive coatings on the mounting collar member 68 may serve as well.

Still alternatively, the entire mounting collar member 68 may be formed of a polymeric material which includes a conductive filler. One such filler which the inventor believes will function well with the polymeric alloy materials described above is carbon fiber filaments. These filaments are chopped into very short lengths and are mixed thoroughly into and throughout the polymeric base material. Preferably, those fibers are loaded into the base polymer material at a loading of thirty percent by weight. The result is a composite of conductive fibers distributed in a nonconductive lightweight polymeric base material matrix. The conductive fibers touch one another or are close enough to one another in the matrix of base material to form a sufficient shield for the image intensifier tube 64.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, while the present invention is illustrated and depicted in the context of an AN/PVS-7B type of night vision device, the invention is equally applicable to other types of night vision devices.

Particularly, head-mounted night vision devices seek to free the operator's hands. In this interest, the weight of the night vision viewer is carried by the head of the user, and the viewer generally is cantilevered by a mounting structure in front of the user's head. Consequently, the user experiences a significant downward weight tending to make the user's head nod forward. Some night vision viewers place a battery pack on the back of the user's head to partially offset the weight of the viewer. However, this counterbalancing weight of the battery pack also increases the weight carried on the user's head and increases the moment of inertia which the user must overcome in order to turn his head. The present invention, on the other hand, addresses the problem of reducing neck strain for the users of night vision devices directly by making the devices lighter in weight while still able to fully meet operational requirements for the devices, including operation under radiated-field conditions. Also, the present invention provides a night vision device of reduced weight having a significantly reduced moment of inertia because the weight-reducing structural improvements to the night vision device are effected as far from the pivot axis of the user's head movement as is possible.

It follows necessarily that the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A night vision device comprising:
a housing which may be suspended relative to a user's head and eyes, the housing having an objective lens admitting low-level light from a scene to be viewed, an image intensifier apparatus providing an intensified image representative of the low-level scene, and an eye piece into which the user may look with at least one eye to view the intensified representative image; said housing including a light-weight mounting collar member supporting said objective lens and at least partially housing said image intensifier apparatus, and said mounting collar being formed of polymeric material, wherein said mounting collar member includes means for shielding said image intensifier apparatus from electromagnetic and electrostatic fields.

2. The night vision device of claim 1 wherein said shielding means includes said mounting collar member having a conductive coating thereon which circumscribes the portion of said image intensifier apparatus which is housed in said mounting collar member.

3. The night vision device of claim 2 wherein said conductive coating is metallic.

4. The night vision device of claim 3 wherein said metallic coating includes a layer of copper carrying a layer of nickel which carries a layer of tin.

5. The night vision device of claim 2 wherein said conductive coating includes a conductive paint.

6. The night vision device of claim 1 wherein said means for shielding said image intensifier apparatus includes said polymeric material including a conductive constituent.

7. The night vision device of claim 6 wherein said conductive constituent includes carbon fiber filaments.

8. The night vision device of claim 7 wherein said conductive carbon fiber filaments comprise about 30 weight percent of said polymeric material.

9. The night vision device of claim 1 wherein said device is of the AN/PVS-7B type.

10. A night vision device of reduced weight and reduced polar moment of inertia for providing to a user of the device an intensified image of a scene which is illuminated with low-level light, said night vision device comprising an eye piece spacing a housing away from the face of the user, the housing carrying an image intensifier tube providing to the user said intensified image representative of the scene, the housing including a forwardly extending boss spacing away from the user's face an objective lens by which low-level light from the scene is received to the image intensifier tube, said housing boss being formed by an elongate tubular objective lens mounting member carrying said objective lens and at least partially housing said image intensifier tube, said elongate objective lens mounting member being formed of light-weight polymeric material which reduces both the weight and polar moment of inertia of said night vision device, and said objective lens mounting member also including means for shielding said portion of said image intensifier tube from electrostatic and electromagnetic fields.

11. A night vision device comprising:
a housing which may be suspended relative to a user's head and eyes, the housing having an objective lens admitting low-level light from a scene to be viewed, an image intensifier apparatus providing an intensified image representative of the low-level scene, and an eye piece into which the user may look with at least one eye to view the intensified representative image; said housing including a light-weight mounting collar member supporting said objective lens and at least partially housing said image intensifier apparatus, and said mounting collar being formed of polymeric material, wherein said polymeric material includes a polymeric alloy having constituents chosen from the group including polycarbonate and polyester.

12. A night vision device of the AN/PVS-7B type having both a reduced weight and a reduced polar moment of inertia, said night vision device comprising:
a housing having an objective lens for receiving low-level light from a night scene, an image intensifier tube for receiving the low-level light and providing an intensified image representative of the night scene, and an eye piece in which said intensified image is visible;
said housing including a light-weight objective lens mounting collar member extending forwardly from the remainder of said housing, said objective lens mounting collar member being formed of a polymeric material and being spaced from a user of said night vision device by said eye piece and said housing, whereby said light-weight collar member reduces the polar moment of inertia for said night vision device because of its light weight and spacing from the user of the device;
wherein said light-weight objective lens mounting collar member also at least partially houses said image intensifier tube.

13. The night vision device of claim 12 wherein said mounting collar member includes means for shielding said image intensifier tube from electromagnetic and electrostatic fields.

14. The night vision device of claim 13 wherein said shielding means includes said mounting collar member having a conductive coating thereon which circumscribes the portion of said image intensifier tube which is housed in said mounting collar member.

15. The night vision device of claim 14 wherein said conductive coating is metallic.

16. The night vision device of claim 15 wherein said metallic coating includes a layer of copper carrying a layer of nickel which carries a layer of tin.

17. The night vision device of claim 14 wherein said conductive coating includes a conductive paint.

18. The night vision device of claim 13 wherein said means for shielding includes said mounting collar member having as a constituent of said polymeric material a conductive particulate loading.

19. The night vision device of claim 18 wherein said conductive particulate loading includes conductive carbon fiber filaments dispersed in said polymeric material.

* * * * *